US 11,241,789 B2

(12) United States Patent
Tang et al.

(10) Patent No.: US 11,241,789 B2
(45) Date of Patent: Feb. 8, 2022

(54) DATA PROCESSING METHOD FOR CARE-GIVING ROBOT AND APPARATUS

(71) Applicant: Huawei Technologies Co., Ltd., Shenzhen (CN)

(72) Inventors: Weidong Tang, Shenzhen (CN); Kangmin Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 297 days.

(21) Appl. No.: 16/579,261

(22) Filed: Sep. 23, 2019

(65) Prior Publication Data

US 2020/0016745 A1 Jan. 16, 2020

Related U.S. Application Data

(63) Continuation of application No. PCT/CN2017/111312, filed on Nov. 16, 2017.

(30) Foreign Application Priority Data

Mar. 24, 2017 (CN) .......................... 201710184421.8

(51) Int. Cl.
*G06F 17/00* (2019.01)
*B25J 9/16* (2006.01)
(Continued)

(52) U.S. Cl.
CPC .............. *B25J 9/163* (2013.01); *B25J 11/001* (2013.01); *B25J 11/0005* (2013.01);
(Continued)

(58) Field of Classification Search
CPC ...... B25J 9/163; B25J 11/0005; B25J 11/001; B25J 11/009; B25J 9/1679; B25J 9/161;
(Continued)

(56) References Cited

U.S. PATENT DOCUMENTS 7,171,286 B2    1/2007   Wang et al.
8,583,282 B2 *  11/2013  Angle .................. G05D 1/0272
                                                    700/245
(Continued)

FOREIGN PATENT DOCUMENTS

CN          102077260 A      5/2011
CN          104635574 A      5/2015
(Continued)

OTHER PUBLICATIONS

Machine Translation and Abstract of Chinese Publication No. CN104635574, May 20, 2015, 21 pages.
(Continued)

*Primary Examiner* — Ronnie M Mancho
(74) *Attorney, Agent, or Firm* — Conley Rose, P.C.

(57) ABSTRACT

A data processing method for a care-giving robot and an apparatus comprises receiving data from a target object comprising a capability parameter of the target object, generating a growing model capability parameter matrix of the target object that includes the capability parameter, a capability parameter adjustment value, and a comprehensive capability parameter that is calculated based on the capability parameter; adjusting the capability parameter adjustment value in the growing model capability parameter matrix, to determine an adjusted capability parameter adjustment value; determining whether the adjusted capability parameter adjustment value exceeds a preset threshold; and sending the adjusted capability parameter adjustment value to a machine learning engine when the adjusted capability parameter adjustment value is within a range of the preset threshold.

20 Claims, 13 Drawing Sheets

(51) Int. Cl.
*B25J 11/00* (2006.01)
*G05B 13/02* (2006.01)
*G05B 13/04* (2006.01)
*H04L 29/08* (2006.01)

(52) U.S. Cl.
CPC ....... *G05B 13/0265* (2013.01); *G05B 13/042* (2013.01); *H04L 67/12* (2013.01)

(58) Field of Classification Search
CPC ...... B25J 9/1656; B25J 9/1653; B25J 9/1661; B25J 11/008; G05B 13/0265; G05B 13/042; G05B 2219/45108; G05B 2219/45109; G05B 2219/36488; H04L 67/12; G10L 15/00; G10L 17/00; G10L 25/78
USPC ........................................................ 700/253
See application file for complete search history.

(56) References Cited

U.S. PATENT DOCUMENTS

| | | | | |
|---|---|---|---|---|
| 8,892,260 | B2* | 11/2014 | Cross | G05D 1/0022 700/259 |
| 8,918,208 | B1* | 12/2014 | Hickman | B25J 9/1602 700/253 |
| 8,996,175 | B2* | 3/2015 | Blumberg | B25J 13/084 700/259 |
| 9,026,248 | B1* | 5/2015 | Hickman | G05B 19/418 700/248 |
| 9,050,723 | B1* | 6/2015 | Elazary | B25J 9/163 |
| 9,186,793 | B1* | 11/2015 | Meier | B60K 11/02 |
| 9,302,393 | B1* | 4/2016 | Rosen | G06N 3/008 |
| 9,308,643 | B2* | 4/2016 | Dooley | B25J 9/1658 |
| 9,314,924 | B1* | 4/2016 | Laurent | G06N 3/049 |
| 9,352,470 | B1* | 5/2016 | da Silva | B25J 13/088 |
| 9,499,218 | B1* | 11/2016 | Stephens | B62D 57/032 |
| 9,586,316 | B1* | 3/2017 | Swilling | B62D 57/032 |
| 9,586,318 | B2* | 3/2017 | Djugash | G06F 1/163 |
| 9,599,990 | B2* | 3/2017 | Halloran | A47L 9/2857 |
| 9,656,392 | B2* | 5/2017 | Irmler | B25J 11/0015 |
| 9,694,495 | B1* | 7/2017 | Edsinger | G05B 19/423 |
| 9,744,672 | B2* | 8/2017 | Sun | G05D 1/0246 |
| 9,776,327 | B2* | 10/2017 | Pinter | G06Q 50/22 |
| 9,849,588 | B2* | 12/2017 | Izhikevich | H04L 12/282 |
| 9,868,214 | B2* | 1/2018 | Zevenbergen | B25J 9/1676 |
| 9,902,061 | B1* | 2/2018 | Kuffner | B25J 9/163 |
| 9,910,761 | B1* | 3/2018 | Jules | G06F 11/3664 |
| 9,975,241 | B2* | 5/2018 | Kamhi | B25J 9/161 |
| 9,975,243 | B2* | 5/2018 | Erhart | H04W 12/068 |
| 10,124,491 | B2* | 11/2018 | Erhart | B25J 9/1697 |
| 10,166,676 | B1* | 1/2019 | Hudson | B25J 13/085 |
| 10,618,174 | B2* | 4/2020 | Augenbraun | G05D 1/0227 |
| 10,696,397 | B2* | 6/2020 | Sekine | G05D 1/0011 |
| 10,768,708 | B1* | 9/2020 | Sills | B25J 9/1633 |
| 10,802,495 | B2* | 10/2020 | Peret | G05D 1/0274 |
| 2003/0088367 | A1 | 5/2003 | Kim et al. | |
| 2004/0167668 | A1 | 8/2004 | Wang et al. | |
| 2005/0215171 | A1 | 9/2005 | Oonaka | |
| 2012/0023660 | A1* | 2/2012 | Ota | A61G 7/1046 5/81.1 R |
| 2013/0103196 | A1* | 4/2013 | Monceaux | A63H 11/18 700/253 |
| 2013/0123658 | A1 | 5/2013 | Oonaka | |
| 2014/0074268 | A1 | 3/2014 | Choi et al. | |
| 2014/0200713 | A1* | 7/2014 | Allen | G05D 1/0246 700/253 |
| 2014/0244037 | A1* | 8/2014 | Scott | G06K 9/228 700/253 |
| 2014/0248597 | A1 | 9/2014 | Dohring et al. | |
| 2014/0324749 | A1 | 10/2014 | Peters et al. | |
| 2014/0350725 | A1* | 11/2014 | LaFary | G05B 19/4061 700/253 |
| 2016/0199977 | A1 | 7/2016 | Breazeal | |
| 2016/0346937 | A1 | 12/2016 | Liao et al. | |
| 2019/0337157 | A1* | 11/2019 | Sun | G06N 20/00 |
| 2019/0385066 | A1* | 12/2019 | Dong | G06N 5/02 |
| 2020/0016745 | A1* | 1/2020 | Tang | B25J 11/0005 |
| 2020/0030662 | A1* | 1/2020 | Yang | A63B 1/00 |

FOREIGN PATENT DOCUMENTS

| | | |
|---|---|---|
| CN | 104808487 A | 7/2015 |
| CN | 105126355 A | 12/2015 |
| CN | 106272449 A | 1/2017 |
| CN | 106462255 A | 2/2017 |
| CN | 106530618 A | 3/2017 |
| CN | 107030691 A | 8/2017 |
| JP | 2003122235 A | 4/2003 |
| JP | 2003200370 A | 7/2003 |
| JP | 2005250423 A | 9/2005 |
| JP | 2005305631 A | 11/2005 |
| JP | 2009199396 A | 9/2009 |
| JP | 2015517689 A | 6/2015 |
| JP | 3204240 U | 5/2016 |
| KR | 20140035031 A | 3/2014 |
| KR | 20140077726 A | 6/2014 |
| KR | 101667281 B1 | 10/2016 |
| WO | 2009157733 A1 | 12/2009 |
| WO | 2016178772 A1 | 11/2016 |

OTHER PUBLICATIONS

Machine Translation and Abstract of Chinese Publication No. CN104808487, Jul. 29, 2015, 19 pages.
Machine Translation and Abstract of Chinese Publication No. CN105126355, Dec. 9, 2015, 16 pages.
Machine Translation and Abstract of Chinese Publication No. CN106462255, Feb. 22, 2017, 16 pages.
Machine Translation and Abstract of Chinese Publication No. CN106530618, Mar. 22, 2017, 13 pages.
Machine Translation and Abstract of Chinese Publication No. CN107030691, Aug. 11, 2017, 33 pages.
Machine Translation and Abstract of Korean Publication No. KR20140077726, Jun. 24, 2014, 12 pages.
Foreign Communication From A Counterpart Application, PCT Application No. PCT/CN2017/111312, English Translation of International Search Report dated Feb. 2, 2018, 2 pages.
Foreign Communication From A Counterpart Application, PCT Application No. PCT/CN2017/111312, English Translation of Written Opinion dated Feb. 2, 2018, 5 pages.
Foreign Communication From A Counterpart Application, Chinese Application No. 201710184421.8, Chinese Office Action dated Feb. 28, 2019, 6 pages.
Jones, A., et al., "Empathic Robotic Tutors for Personalised Learning: A Multidisciplinary Approach," XP047325228, International Conference on Financial Cryptography and Data Security; [Lecture Notes in Computer Science; Lect.Notes Computer], Springer, Berlin, Heidelberg, Oct. 28, 2015, pp. 285-295.
Prentzas, J., "Artificial Intelligence Methods in Early Childhood Education," XP055667421, In: "Studies in Computational Intelligence", Jan. 2013, Springer-Verlag, Berlin Heidelberg, pp. 1-32.
Garcia, J., et al., "A Comprehensive Survey on Safe Reinforcement Learning," XP055667424, Journal of Machine Learning Research, Aug. 15, 2015, pp. 1437-1480.
Kober, J., et al., "Reinforcement Learning in Robotics: A Survey," XP055667429, The International Journal of Robotics Research, Sep. 1, 2013, pp. 1-73.
Foreign Communication From A Counterpart Application, European Application No. 17901629.0, Extended European Search Report dated Feb. 18, 2020, 10 pages.

* cited by examiner

Tested person: Dolores
Testing age: 5.0 years

| Ability parameter | Actually measured ability | Statistical ability | Largest value | Smallest value | Adjustment value | Adjustment amplitude | Remark |
|---|---|---|---|---|---|---|---|
| Expression ability | 4.8 | 5.0 | 5.3 | 4.0 | 5.0 | 4.0% | |
| Thinking ability | 5.6 | 5.0 | 5.9 | 4.2 | 5.7 | 2.0% | |
| Observation ability | 5.0 | 5.0 | 5.3 | 3.5 | 5.0 | 0.0% | |
| Attention ability | 3.8 | 5.0 | 5.5 | 4.1 | 4.5 | 14.0% | * |
| Memory ability | 4.6 | 5.0 | 6.0 | 4.5 | 4.2 | -8.0% | |
| Imagination ability | 4.6 | 5.0 | 5.5 | 4.2 | 5.2 | 12.0% | |
| Athletic ability | 6.0 | 5.0 | 5.5 | 4.5 | 5.0 | -20.0% | * |
| Comprehensive ability | 4.9 | 5.0 | 5.6 | 4.1 | 4.9 | 0.6% | |

FIG. 6

DATA PROCESSING METHOD FOR CARE-GIVING ROBOT AND APPARATUS

CROSS-REFERENCE TO RELATED APPLICATIONS

This application is a continuation application of International Application No. PCT/CN2017/111312, filed on Nov. 16, 2017, which claims priority to Chinese Patent Application No. 201710184421.8, filed on Mar. 24, 2017, both of these applications are hereby incorporated by reference in their entireties.

TECHNICAL FIELD

This application relates to the field of robot technologies, and in particular, to a data processing method for a care-giving robot and an apparatus.

BACKGROUND

With the development of digitalization and artificial intelligence technologies, a part or all of conventional child care and training work has been replaced by intelligent electronic devices. A relatively good product form of an intelligent electronic devices is a child care-giving robot. Main content of conventional child care and training actually is effective interaction between a care giver and a care receiver. The care giver selects an appropriate communication way and appropriate communication content based on an emotion status of the care receiver. For example, when a human teacher having rich teaching experience teaches a student a relatively complex math problem, the teacher may determine an emotion status of the student based on a facial expression, a speech tone, a body posture, a movement feature, and the like of the student, and select an efficient teaching manner suitable for the student. When the teacher observes a depression expression of the student, the teacher may slow down a speaking speed, and use content more familiar to the student, or use a different interaction mode, to reduce fatigue and frustration feelings of the student and improve teaching and interaction efficiency. In addition, it is proven through preschool education experience that most children prefer to interact and communicate with slightly elder friends, to keep sufficient learning interests and passion.

In other approaches, after calculating an emotion status of an interaction object, a child care-giving robot obtains through adaption an appropriate interaction mode and appropriate interaction content. Further, when interacting with a human being, the child care-giving robot collects physiological data of the human being using one or more sensors, monitors a mood reaction of a user in a particular environment, recognizes an emotion status of the user based on the mood reaction of the user, adjusts an interaction skill of the robot based on the emotion status of the user, and makes a response using a language and non-language second interaction means, to achieve objectives of communication, performance, training, notification, entertainment, and the like.

To sum up, in an embodiment, a child is willing to interact and communicate with a slightly elder friend. However, in other approaches, the child care-giving robot can obtain through adaption an appropriate interaction mode and appropriate interaction content only by calculating an emotion status of an interaction object, but cannot simulate an interaction object that is more excellent than the child in knowledge and communication skills when interacting with the child, cannot play a role of an elder "brother" or "sister", and cannot keep the child maintaining sufficient learning interests and passion.

SUMMARY

This application provides a data processing method for a care-giving robot and an apparatus, to resolve a problem in some approaches that a care-giving robot can perform selection from specified interaction modes only by calculating an emotion status of an interaction object, but cannot provide a more appropriate interaction mode for the interaction object.

According to a first aspect, this application provides a data processing method for a care-giving robot, where the method includes receiving, by a model engine, data of a target object, and generating a growing model capability parameter matrix of the target object, where the data includes an capability parameter of the target object, the capability parameter includes an actually measured capability parameter and a statistical capability parameter that corresponds to the target object, and the generated growing model capability parameter matrix of the target object includes the capability parameter, and an capability parameter adjustment value and a comprehensive capability parameter that are calculated based on the capability parameter, the actually measured capability parameter is data that is of the target object in a natural social scenario and that is obtained using a sensor, and the statistical capability parameter is provided by a third-party network cloud service organization, adjusting the capability parameter adjustment value in the growing model capability parameter matrix based on an adjustment formula coefficient or based on a standard growing model capability parameter matrix, to determine an adjusted capability parameter adjustment value, where the formula is used to calculate the comprehensive capability parameter and the capability parameter adjustment value based on the capability parameter, determining, by the model engine, whether the adjusted capability parameter adjustment value exceeds a preset threshold, and sending, by the model engine, the adjusted capability parameter adjustment value to a machine learning engine if the adjusted capability parameter adjustment value is within a range of the preset threshold, where the machine learning engine provides, for an artificial intelligence module based on the capability parameter adjustment value, an capability parameter required for interacting with the target object.

In this embodiment of the present disclosure, the growing model capability parameter matrix of the target object is generated based on the actually measured capability parameter that is of the target object in the natural social scenario and that is collected using the sensor and the statistical capability parameter that is provided by the third-party network cloud service organization, the capability parameter adjustment value in the growing model capability parameter matrix is adjusted based on the adjustment formula coefficient or a parameter in the standard growing model capability parameter matrix, a value of a comprehensive capability parameter determined based on the adjusted capability parameter adjustment value is not less than a value of the comprehensive capability parameter that is determined based on the actually measured capability parameter and that is in the growing model capability parameter matrix of the target object, and the adjusted capability parameter adjustment value is sent to the machine learning engine such that the machine learning engine provides, for the artificial intelligence module, the capability parameter required for interacting with the target object. In other words, an ability of a care-giving robot using the modified capability parameter adjustment value is slightly higher than an ability of the target object such that the target object keeps sufficient learning interests and passion of interacting with the care-giving robot.

In a possible design, the model engine receives the capability parameter of the target object, performs calculation based on the received capability parameter to determine the capability parameter adjustment value and the comprehensive capability parameter, and adds the capability parameter, the capability parameter adjustment value, and the comprehensive capability parameter to a specified capability parameter matrix template to generate the growing model capability parameter matrix of the target object.

In a possible design, after the adjusting, by the model engine, the capability parameter adjustment value in the growing model capability parameter matrix, to determine an adjusted capability parameter adjustment value, the method further includes adjusting, by the model engine, the capability parameter in the growing model capability parameter matrix according to a received instruction for manually adjusting an capability parameter, and determining the adjusted capability parameter adjustment value based on an adjusted capability parameter.

In this embodiment of the present disclosure, an instruction sent by a user for manually adjusting an capability parameter is received such that the capability parameter in the growing model capability parameter matrix is manually adjusted, to focus on training of an ability of the target object in any aspect, and provide a more appropriate interaction mode for the target object.

In a possible design, a weighted average value of the adjusted capability parameter adjustment value is greater than or equal to a weighted average value of the actually measured capability parameter before adjustment.

In this embodiment of the present disclosure, the care-giving robot uses the adjusted capability parameter adjustment value such that an ability of the care-giving robot can be higher than or equal to that of the target object, to achieve a care-giving objective.

According to a second aspect, this application provides a model engine, including a model generation module configured to receive data of a target object, and generate a growing model capability parameter matrix of the target object, where the data includes an capability parameter of the target object, the capability parameter includes an actually measured capability parameter and a statistical capability parameter that corresponds to the target object, and the generated growing model capability parameter matrix of the target object includes the capability parameter, and an capability parameter adjustment value and a comprehensive capability parameter that are calculated based on the capability parameter, and a model correction module configured to adjust the capability parameter adjustment value in the growing model capability parameter matrix based on an adjustment formula coefficient or based on a standard growing model capability parameter matrix, to determine an adjusted capability parameter adjustment value, where the formula is used to calculate the comprehensive capability parameter and the capability parameter adjustment value based on the capability parameter, where the model correction module is further configured to determine whether the adjusted capability parameter adjustment value exceeds a preset threshold, and send, by the model engine, the adjusted capability parameter adjustment value to a machine learning engine if the adjusted capability parameter adjustment value is within a range of the preset threshold, where the machine learning engine provides, for an artificial intelligence module based on the capability parameter adjustment value, an capability parameter required for interacting with the target object.

In a possible design, the model generation module is further configured to receive the capability parameter of the target object, perform calculation based on the received capability parameter to determine the capability parameter adjustment value and the comprehensive capability parameter, and add the capability parameter, the capability parameter adjustment value, and the comprehensive capability parameter to a specified capability parameter matrix template to generate the growing model capability parameter matrix of the target object.

In a possible design, the model correction module is further configured to adjust the capability parameter in the growing model capability parameter matrix according to a received instruction for manually adjusting an capability parameter, and determine the adjusted capability parameter adjustment value based on an adjusted capability parameter.

In a possible design, a weighted average value of the adjusted capability parameter adjustment value is greater than or equal to a weighted average value of the actually measured capability parameter before adjustment.

According to a third aspect, this application provides a model engine, where the model engine includes a memory configured to store a program instruction, and a processor configured to invoke the program instruction stored in the memory, to receive data of a target object through a communications interface, and generate a growing model capability parameter matrix of the target object, where the data includes an capability parameter of the target object, the capability parameter includes an actually measured capability parameter and a statistical capability parameter that corresponds to the target object, and the generated growing model capability parameter matrix of the target object includes the capability parameter, and an capability parameter adjustment value and a comprehensive capability parameter that are calculated based on the capability parameter, adjust, by the processor, the capability parameter adjustment value in the growing model capability parameter matrix based on an adjustment formula coefficient or based on a standard growing model capability parameter matrix, to determine an adjusted capability parameter adjustment value, where the formula is used to calculate the comprehensive capability parameter and the capability parameter adjustment value based on the capability parameter, determine, by the processor, whether the adjusted capability parameter adjustment value exceeds a preset threshold, and send, by the processor, the adjusted capability parameter adjustment value to a machine learning engine if the adjusted capability parameter adjustment value is within a range of the preset threshold, where the machine learning engine provides, for an artificial intelligence module based on the capability parameter adjustment value, an capability parameter required for interacting with the target object.

In a possible design, the processor is further configured to receive the capability parameter of the target object through the communications interface, perform calculation based on the received capability parameter to determine the capability parameter adjustment value and the comprehensive capability parameter, and add the capability parameter, the capability parameter adjustment value, and the comprehensive capability parameter to a specified capability parameter matrix template to generate the growing model capability parameter matrix of the target object.

In a possible design, the processor is further configured to adjust the capability parameter in the growing model capability parameter matrix according to a received instruction for manually adjusting an capability parameter, and determine the adjusted capability parameter adjustment value based on an adjusted capability parameter.

According to a fourth aspect, this application further provides a computer readable storage medium configured to store a computer software instruction used for executing functions of the foregoing first aspect and any design of the first aspect, where the computer software instruction includes a program designed for executing the method of the foregoing first aspect and any design of the first aspect.

BRIEF DESCRIPTION OF DRAWINGS

FIG. 6 shows a growing model capability parameter matrix according to this application.

DESCRIPTION OF EMBODIMENTS

To make the objectives, technical solutions, and advantages of this application clearer, the following further describes this application in detail with reference to the accompanying drawings.

This application provides a data processing method for a care-giving robot and a model engine, to resolve a problem in some approaches that a care-giving robot can perform selection from specified interaction modes only by calculating an emotion status of an interaction object, but cannot provide a more appropriate interaction mode for the interaction object. The method and the apparatus are based on a same inventive concept. Because principles of the method and the apparatus for resolving a problem are similar, mutual reference may be made between implementation of the apparatus and implementation of the method, and repeated descriptions are omitted.

Figure 1:
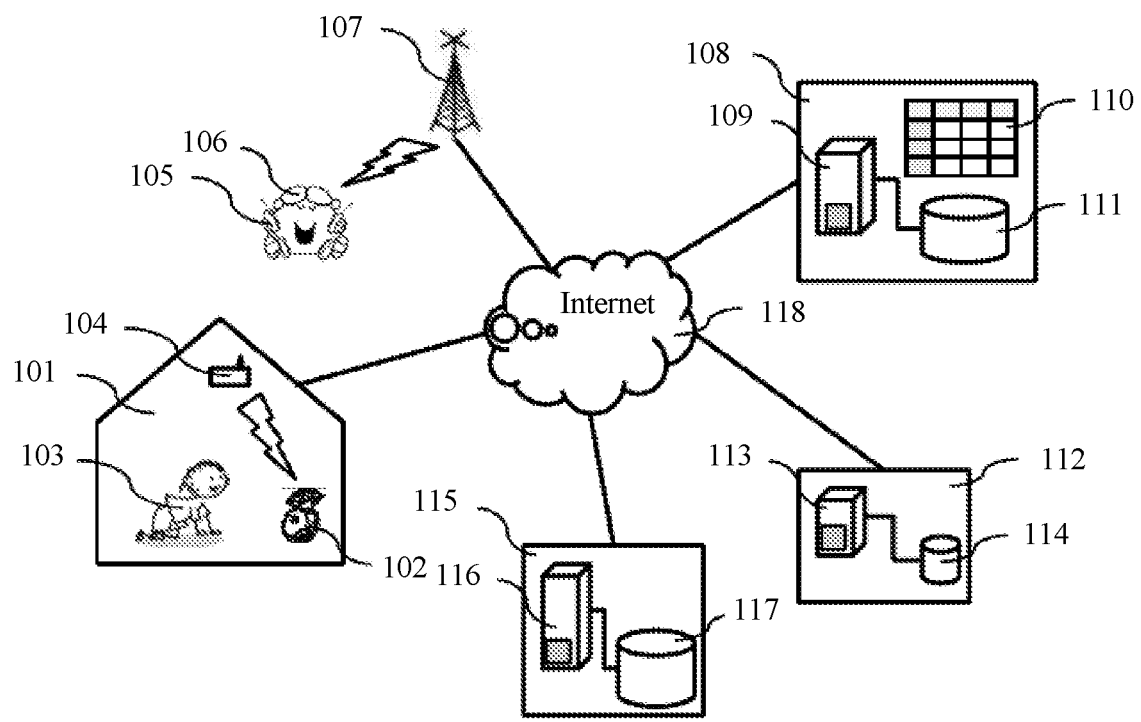
FIG. 1 is a system structural diagram of a child care-giving robot and a use environment according to this application.

This application may be applied to a system of a child care-giving robot and a use environment. The system architecture is shown in FIG. 1. The use environment of the child care-giving robot is applicable to any scenario such as a community, a residential district, an administrative district, a province, a country, a transnational scenario, and a global scenario, and needs to include the following units a family or a child care-giving organization 101, a statutory guardian 106 of a care-receiving object, an intelligent terminal 105 carried by the statutory guardian 106, an outdoor radio access network 107, a child care service organization 108, a social public service organization 112, and at least one third-party network cloud service organization 115. The family or the child care-giving organization 101 includes a child care-giving robot 102, at least one care-receiving child 103, and at least one indoor radio access network 104. The outdoor radio access network 107 provides a remote wireless network access service for the intelligent terminal 105. The child care service organization 108 provides a professional data service for a child care service, and includes a child growing cloud server 109, a child growing model library 110, and a child care knowledge base 111. The social public service organization 112 provides government public data support for the child care service, including but not limited to a weather forecast, a list of medical service organizations, epidemic information, an urgent notification, and the like. The social public service organization 112 includes a social public service cloud server 113 and a social public service cloud database 114. The at least one third-party network cloud service organization 115 provides a fine professional network cloud data service for the child care service, for example, instant messaging, a social application of the child care service, an online audio and video service, online shopping, payment and logistics tracking, and evaluation and voting for communities and medical organizations, and includes a third-party network service cloud server 116 and a third-party network service cloud database 117. The system architecture of the use environment further includes the Internet 118 over which a network operator provides a network service.

In addition, it should be understood that in the descriptions of this application, terms such as "first" and "second" are merely used for distinguishing, but should not be understood as indicating or implying relative importance, and should not be understood as indicating or implying a sequence.

In this embodiment of the present disclosure, a growing model capability parameter matrix of a target object is generated based on an actually measured capability parameter that is of the target object in a natural social scenario and that is collected using a sensor and a statistical capability parameter that is provided by a third-party network cloud service organization, an capability parameter adjustment value in the growing model capability parameter matrix is adjusted based on an adjustment formula coefficient or a parameter in a standard growing model capability parameter matrix, a value of a comprehensive capability parameter determined based on an adjusted capability parameter adjustment value is not less than a value of a comprehensive capability parameter that is determined based on the actually measured capability parameter and that is in the growing model capability parameter matrix of the target object, and the adjusted capability parameter adjustment value is sent to a machine learning engine such that the machine learning engine provides, for an artificial intelligence module, an capability parameter required for interacting with the target object. In other words, an ability of the care-giving robot using the modified capability parameter adjustment value is slightly higher than an ability of the target object such that the target object keeps sufficient learning interests and passion of interacting with the care-giving robot.

Figure 2:
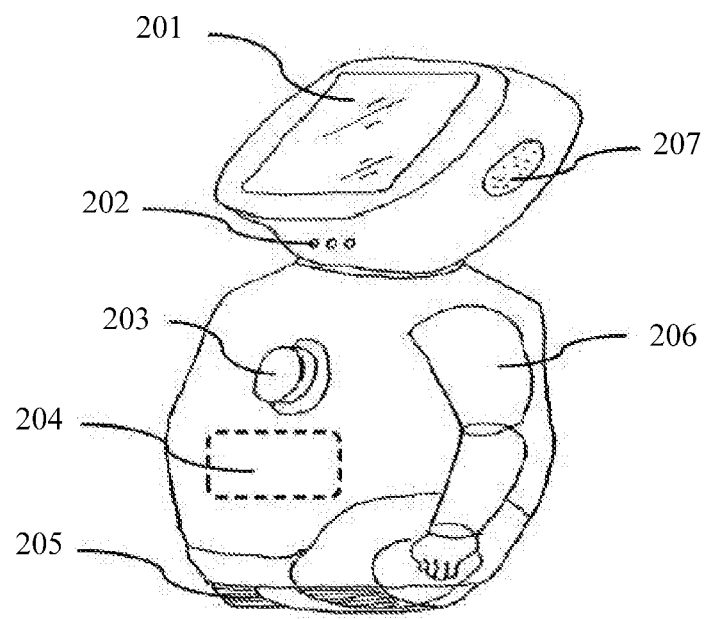
FIG. 2 is a schematic diagram of a product form of a child care-giving robot according to this application.

In this embodiment of the present disclosure, a product form of the child care-giving robot 102 in FIG. 1 may be shown in FIG. 2, and includes a touchscreen 201 configured to present a graphic or image information to a care-receiving object, and receive a touch control signal of a user, a microphone array and sensor group 202 configured to detect features of the care-receiving object such as sound, an expression, and behavior, a start/pause/emergency button 203 configured to provide a simple operation instruction for the care-receiving object, and respond to an interruption instruction of the user under emergency, and a processing and calculation module 204 configured to calculate and output a control instruction of the child care-giving robot based on a user status signal input by the microphone array and sensor group 202, a user operation instruction of the start/pause/emergency button 203, guardian request information of the care-receiving object from a network, a service instruction of a child care service organization from a network, third-party network cloud service data, and the like such that the child care-giving robot outputs sound, a graphic, an image, a body action, a movement direction, and the like based on the control instruction. The child care-giving robot further includes a mechanical crawler/wheel movement apparatus 205, a mechanical arm 206, and a loudspeaker module 207. The loudspeaker module 207 is configured to provide a sound output signal for the care-receiving object.

In this embodiment of the present disclosure, the child care-giving robot establishes social, emotion, and interpersonal linkage and interaction with the care-receiving object and the guardian of the care-receiving object of the child care-giving robot using the touchscreen 201, the mechanical crawler/wheel movement apparatus 205, the mechanical arm 206, and the loudspeaker module 207. The child care-giving robot may perform various functions for the care-receiving object of the child care-giving robot, to promote and participate in meaningful social activities between users. The social activities include but are not limited to providing effective companionship and communication, skill training, message transmission and prompt, and other more complex services for the care-receiving object, and further include photographing and voice recording, singing accompaniment, joining in games and sharing family stories and knowledge, and the like. A function of the child care-giving robot further includes providing a user-friendly interface on the touchscreen 201, for example, displaying a graphic, a carton character, a pet, and images of parents and the elder on the touchscreen. With reference to a real-time scenario, the child care-giving robot moves using the mechanical crawler/wheel movement apparatus 205, completes a body action using the mechanical arm 206, and improves communication efficiency and a companionship relationship with the care-receiving object by presenting color light and the like.

Figure 3:
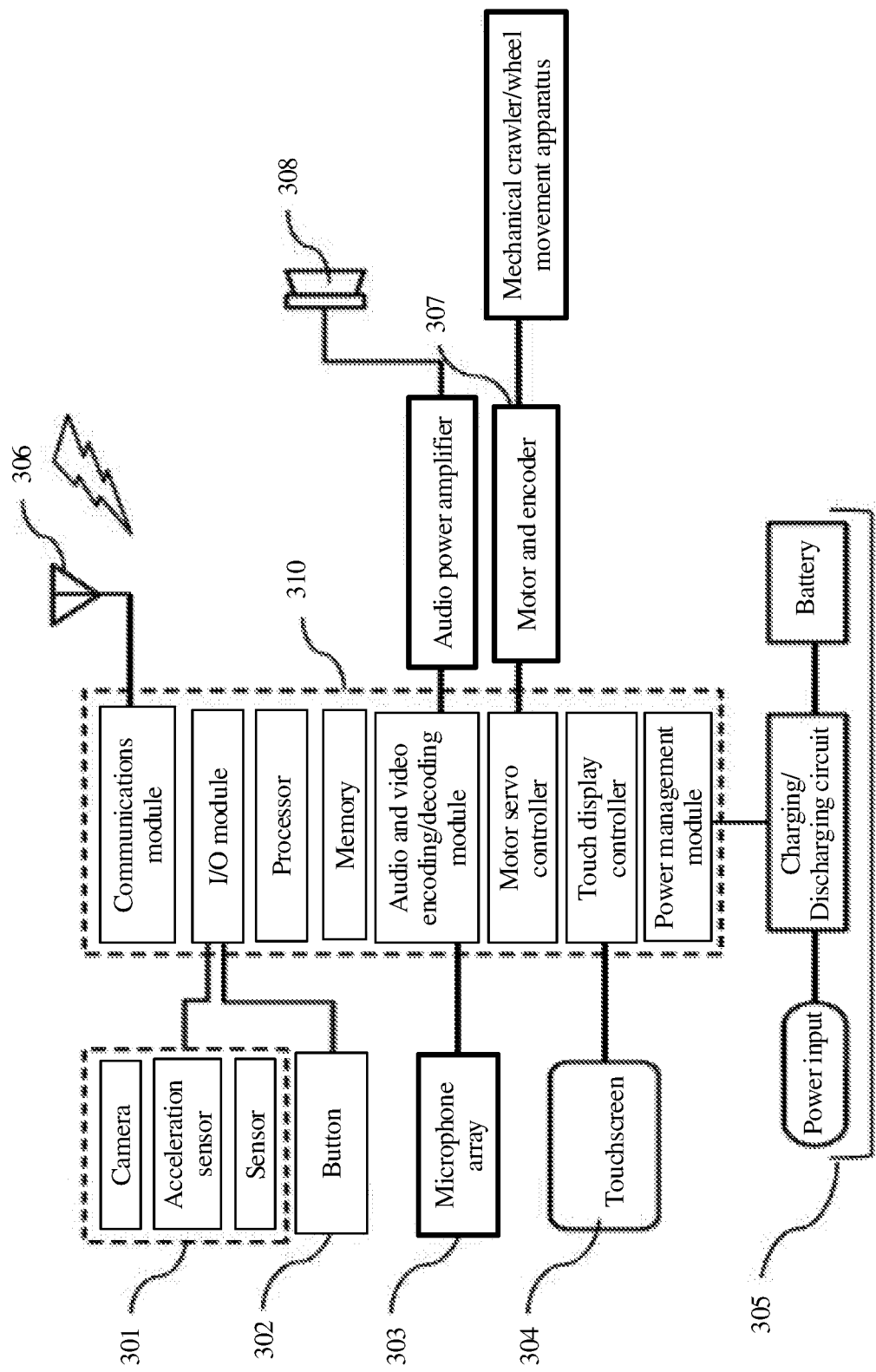
FIG. 3 is a schematic diagram of a hardware structure of a processing and calculation module of a child care-giving robot according to this application.

In this embodiment of the present disclosure, a core component of the child care-giving robot is the processing and calculation module 204. A hardware structure of the processing and calculation module 204 is shown in FIG. 3, and includes a mainboard 310 and other peripheral functional components. A sensor group 301 and a button 302 each are connected to an I/O module of the mainboard 310. A microphone array 303 is connected to an audio and video encoding/decoding module of the mainboard 310. A touch display controller of the mainboard 310 receives touch control input of the touchscreen 304 and provides and displays a drive signal. A motor servo controller drives a motor and encoder 307 based on a program instruction. The motor and encoder 307 drives the mechanical crawler/wheel movement apparatus and the mechanical arm such that the care-giving robot moves and outputs a body language. Sound of the care-giving robot is provided in such a way that the audio encoding/decoding module outputs sound to a power amplifier and a loudspeaker 308 outputs the sound. The mainboard 310 further includes a processor and a memory. The memory stores an algorithm, an execution program, and a configuration file of the execution program of the care-giving robot, further stores audio and video and image files and the like required for the care-giving robot to carry out care-giving work, and further stores some temporary files during program running. A communications module of the mainboard 310 provides a function of communication between the care-giving robot and an external network. Preferably, a Bluetooth or Wi-Fi module is used for near field communication. The mainboard 310 further includes a power management module, to implement battery charging and discharging and power-saving management of a device through a connected power system 305. A wireless receive and transmit antenna apparatus 306 is connected to the mainboard 310.

The following describes a data processing method for a care-giving robot in this application with reference to the accompanying drawings.

Figure 4:
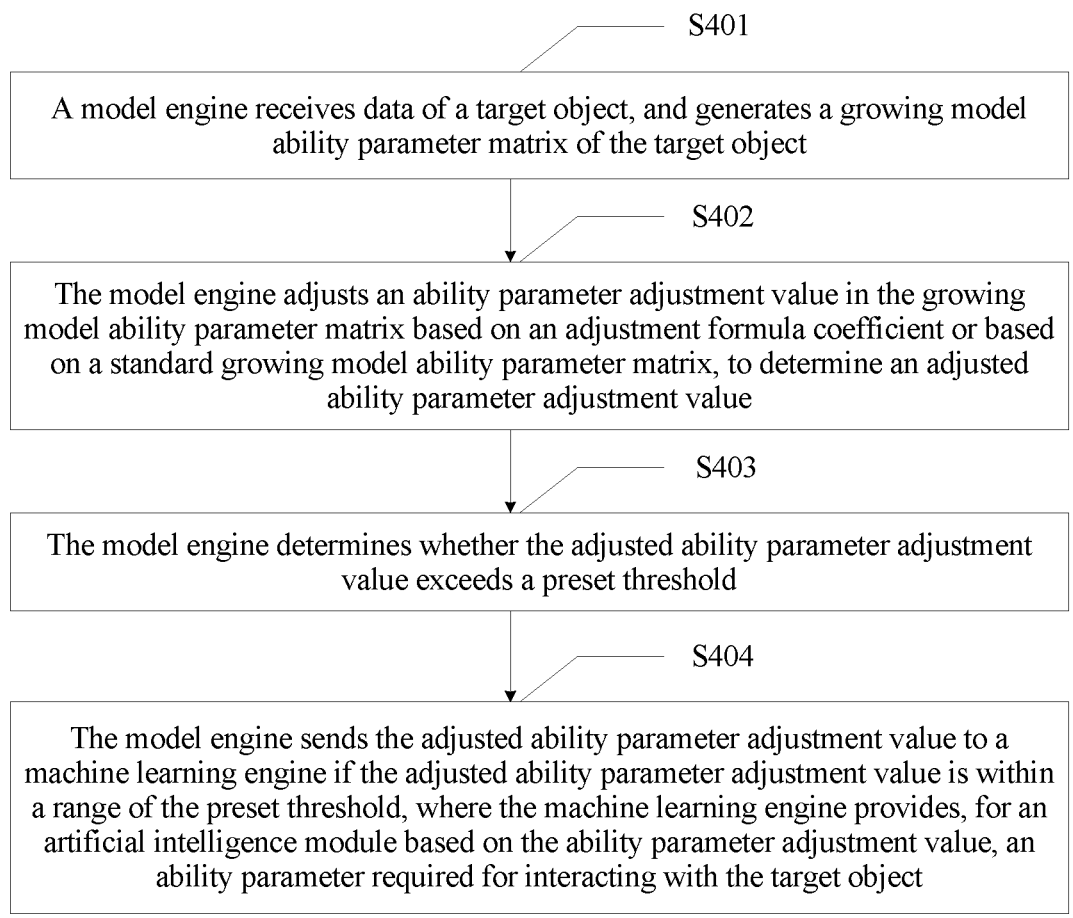
FIG. 4 is a flowchart of a data processing method for a care-giving robot according to this application.

Referring to FIG. 4, the method in this application includes the following steps.

S401: A model engine receives data of a target object, and generates a growing model capability parameter matrix of the target object, where the data includes an capability parameter of the target object, the capability parameter includes an actually measured capability parameter and a statistical capability parameter that corresponds to the target object, and the generated growing model capability parameter matrix of the target object includes the capability parameter, and an capability parameter adjustment value and a comprehensive capability parameter that are calculated based on the capability parameter.

Further, the actually measured capability parameter may be of the target object in a natural social scenario and obtained using a sensor, or may be determined by performing ability evaluation for the target object in advance. The statistical capability parameter is provided by a third-party network cloud service organization, and is obtained through statistics collection based on objects of an age range corresponding to the target object.

Optionally, the growing model capability parameter matrix may be obtained from an artificial intelligence module.

Figure 5:
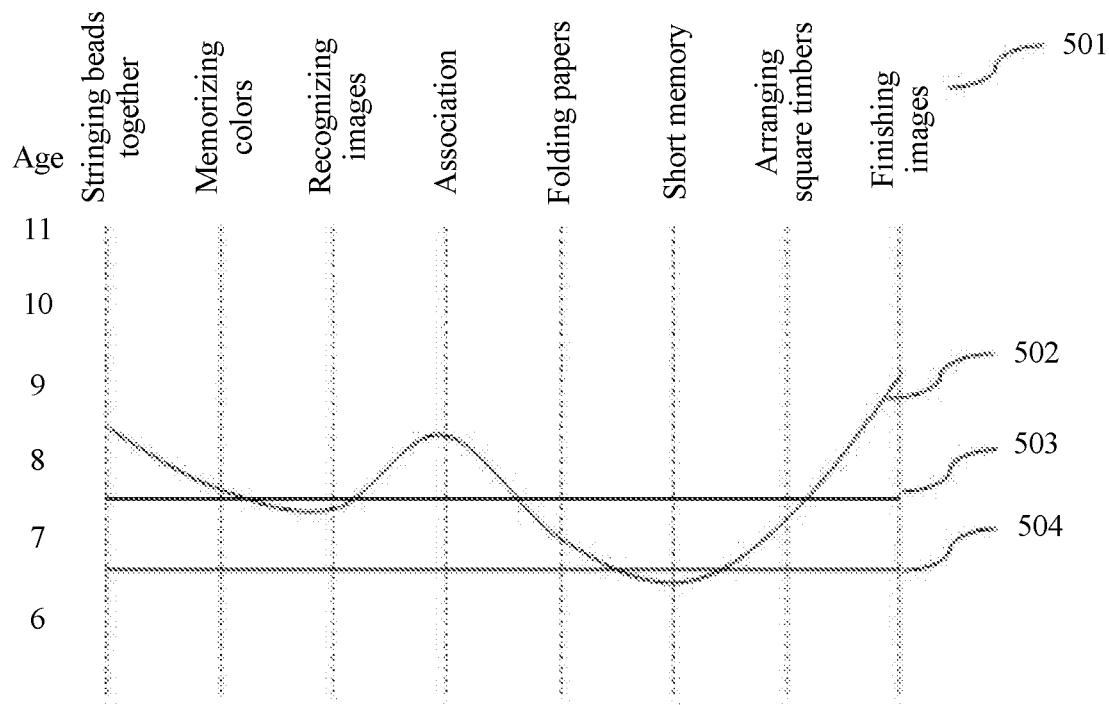
FIG. 5 is a schematic diagram of an ability estimation result according to this application.

For example, the target object may be a care-receiving object, the data may be sound, an expression, an action, and the like of the care-receiving object, the third-party professional service organization evaluates abilities of the care-receiving object, and the abilities include an expression ability, a thinking ability, an observation ability, an attention ability, a memory ability, an imagination ability, and an athletic ability. All ability evaluation parameters are displayed based on an age corresponding to an ability. For example, the third-party network cloud service organization may perform child learning ability evaluation using a Hiskey-Nebraska test of learning aptitude (H-NTLA) standard or a testing model formulated by the national rehabilitation center, and output a learning ability evaluation result. Learning ability evaluation may be performed periodically, for example, every a quarter or every a half year. Tested objects are mainly children aged three to eight. Comprehensive learning abilities of children are quantized usually using a method for testing based on a plurality of subjects such as stringing beads together, association, arranging square timbers, memorizing colors, recognizing images, a short memory, folding papers, and association, a result and suggestion report is output and analyzed, and a long-term sustainable ability training and testing service is provided. A specific report sample is shown in FIG. 5. The horizontal axis indicates subjects, and the longitudinal axis indicates ages. An age of a tested object is 6.5 years. There are a plurality of testing subjects 501, subject testing scores 502, ages 504 of tested objects, and mental ages 503 obtained through fitting based on subject testing results and an average testing score that corresponds to the age. Superior subjects of the tested object are stringing beads together, memorizing colors, recognizing images, association, folding papers, arranging square timbers, and finishing images, and an inferior subject is the short memory. The mental age of the tested object is equivalent to 7.4 years. An analysis result and a suggestion obtained based on FIG. 5 are as follows. An ability of the tested object is higher than an average statistical value, attend to balanced ability development, and keep an advantage of a language ability. A growing model capability parameter matrix generated for another tested object is shown in FIG. 6. A user name of a care-receiving object is Dolores, a 5-year old girl. An ability age is an age value corresponding to a typical statistical average value of an ability subject obtained by converting an actual testing score of the ability. For example, a testing score of an athletic ability 610 of Dolores is 123.4, and is equivalent to an average athletic ability score value of 6-year old children. Therefore, an actually measured ability 602 is 6.0. Each ability testing item in the growing model capability parameter matrix 601 further includes a largest social statistical value 604 and a smallest social statistical value 605 corresponding to the age, a statistical ability 603, an adjustment value 606, an adjustment amplitude 607, and a remark 608. Single-ability testing data of 99.6% children falls between the largest value and the smallest value. The growing model capability parameter matrix 601 may further include an attention ability 609, an athletic ability 610, remark content 611 and 612, and a comprehensive ability 613. The comprehensive ability 613 is obtained by calculating an arithmetic average value of scores of the actually measured ability 602, or may be obtained by calculating a weighted sum of scores of the actually measured ability 602, where a weight coefficient may be obtained through allocation based on weights of capability parameters required for learning and training of the artificial intelligence module, or may be a weight proportion that is of capability parameters required for learning and training of the artificial intelligence module and that is adjusted and allocated by a user. A calculation formula 1 of a comprehensive ability value is as follows.

$$T = W1 \times C1 + W2 \times C2 + W3 \times C3 + W4 \times C4 + \ldots Wn \times Cn \quad \text{(formula 1)}$$

where, T is a comprehensive ability value, Wn is a weight coefficient of an $n^{th}$ capability parameter, and Cn is a testing value of an $n^{th}$ ability.

S402: The model engine adjusts the capability parameter adjustment value in the growing model capability parameter matrix based on an adjustment formula coefficient or based on a standard growing model capability parameter matrix, to determine an adjusted capability parameter adjustment value, where the formula is used to calculate the comprehensive capability parameter and the capability parameter adjustment value based on the capability parameter.

For example, a lawful guardian of the care-receiving object finds a learning model for Dolores in a social activity. The model is a girl Susan who is slightly elder than Dolores, and performance of Sudan is obviously better than that of Dolores in some abilities. A lawful guardian of Susan agrees to share a growing capability parameter matrix of Susan with the lawful guardian of Dolores, and the lawful guardian of Dolores obtains the growing capability parameter matrix using a mobile phone application (APP) or through short range communication. A format of the growing capability parameter matrix data may need to be converted, to ensure that the growing capability parameter matrix is the same as that in FIG. 6. Optionally, the lawful guardian of Dolores may further partially adjust the obtained growing capability parameter matrix of Susan, to select a growing capability parameter matrix more suitable for Dolores.

S403: The model engine determines whether the adjusted capability parameter adjustment value exceeds a preset threshold.

Optionally, if the adjusted capability parameter exceeds the preset threshold, step S402 is performed again.

S404: The model engine sends the adjusted capability parameter adjustment value to a machine learning engine if the adjusted capability parameter adjustment value is within a range of the preset threshold, where the machine learning engine provides, for an artificial intelligence module based on the capability parameter adjustment value, an capability parameter required for interacting with the target object.

In this embodiment of the present disclosure, the adjusted capability parameter adjustment value in the growing model capability parameter matrix of the target object is provided for the machine learning engine of the care-giving robot, a feature parameter about how to effectively interact with an interaction object is provided for the artificial intelligence module of the care-giving robot using functions of a neural network, a machine learning model, and the like, and is sent to a decision-maker and executor. Further, various interaction content of the care-giving robot is implemented using an execution apparatus. The interaction content includes mechanical position movement, simulating and displaying an expression, a light effect, music playing, a text, a pattern, or a speaking speed, speech, tone, and conversation content to which the user can adapt, and further includes providing content such as speech communication, training, prompt, photographing, establishing/maintaining/sharing family stories and knowledge, games, music negotiation, and even keep-fit exercises for a care-receiving object, establishing a close friend relationship, and establishing human fellow-like close relationship with a child user through rich interaction and applications. Optionally, a part of the machine learning engine may be implemented at a cloud end, for example, the third-party network cloud service organization provides timely update of the growing model capability parameter matrix through constant learning and algorithm improvement using various cloud feature-based training systems. The other part is locally performed, for example, on the artificial intelligence module, to ensure that the care-giving robot can run reliably when getting offline. The care-giving robot may further select an appropriate machine learning mode based on whether the care-giving robot is online. For example, the model engine calculates an ability adjustment value based on an actually measured ability value, a statistical ability value, a largest value, and a smallest value of a tested object. The ability adjustment value takes the place of the actually measured ability value, and is used in a next period of a learning and training process of the artificial intelligence module, to ensure that a comprehensive ability of the care-giving robot can be slightly higher than a comprehensive ability of a current care-receiving child and the care-giving robot interacts with the care-receiving object in the next period of machine learning and training. Further, a calculation manner of an ability adjustment algorithm is as follows.

$$Cadj = K \times C$$

$\Sigma Cmin \geq \Sigma Cadj \geq \Sigma Cmax$, where Cadj is an ability adjustment value, K is an ability growing coefficient, and ranges from 1.00 to 1.50, C is an actually measured ability value of a single test, $\Sigma Cadj$ is a comprehensive ability value, $\Sigma Cmin$ is a lower limit of a social statistical value of a comprehensive ability value, and $\Sigma Cmax$ is an upper limit of a social statistical value of a comprehensive ability value.

After step S104, the model engine adjusts the capability parameter in the growing model capability parameter matrix according to a received instruction for manually adjusting an capability parameter, and determines the adjusted capability parameter adjustment value based on an adjusted capability parameter. Optionally, if the adjusted capability parameter exceeds a preset threshold, the foregoing step is performed again.

Figure 7:
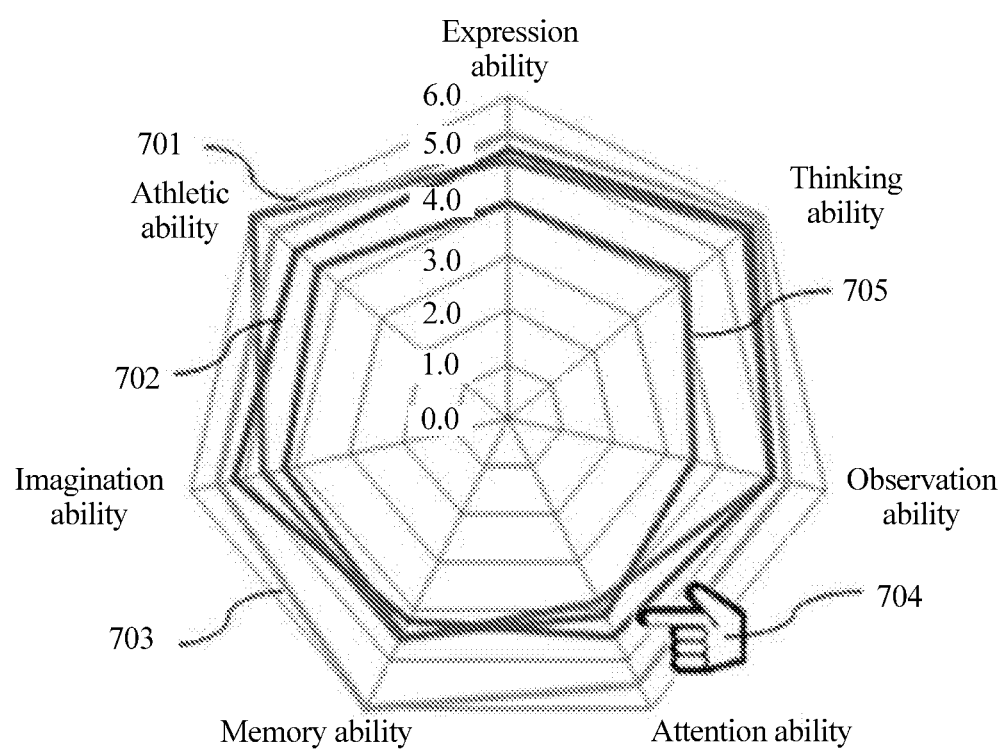
FIG. 7 is a radar diagram according to this application.

For example, a lawful guardian of the care-receiving object may manually adjust the growing model capability parameter matrix of the care-receiving object using a mobile intelligent terminal, and a schematic diagram shown in FIG. 7 is displayed on a user interface of an application of the mobile intelligent terminal, to present an expression ability, a thinking ability, an observation ability, an attention ability, a memory ability, an imagination ability, and an athletic ability to the user using a radar chart. The user may adjust an adjustment value capability parameter 702 using a sliding gesture 704, and an adjusted adjustment value capability parameter does not exceed a range between a largest statistical value 703 and a smallest statistical value 705. When the adjustment value capability parameter is adjusted, an ability value of an ability item having a relatively higher ability value may be reduced appropriately, to keep balanced development of various abilities, and it can be ensured that a comprehensive ability of the care-receiving object after the adjustment is not lower than a current actually measured comprehensive ability 701. Optionally, the user may customize a border threshold of the capability parameter, and the border threshold of the capability parameter is not affected by a statistical value.

Figure 8A:
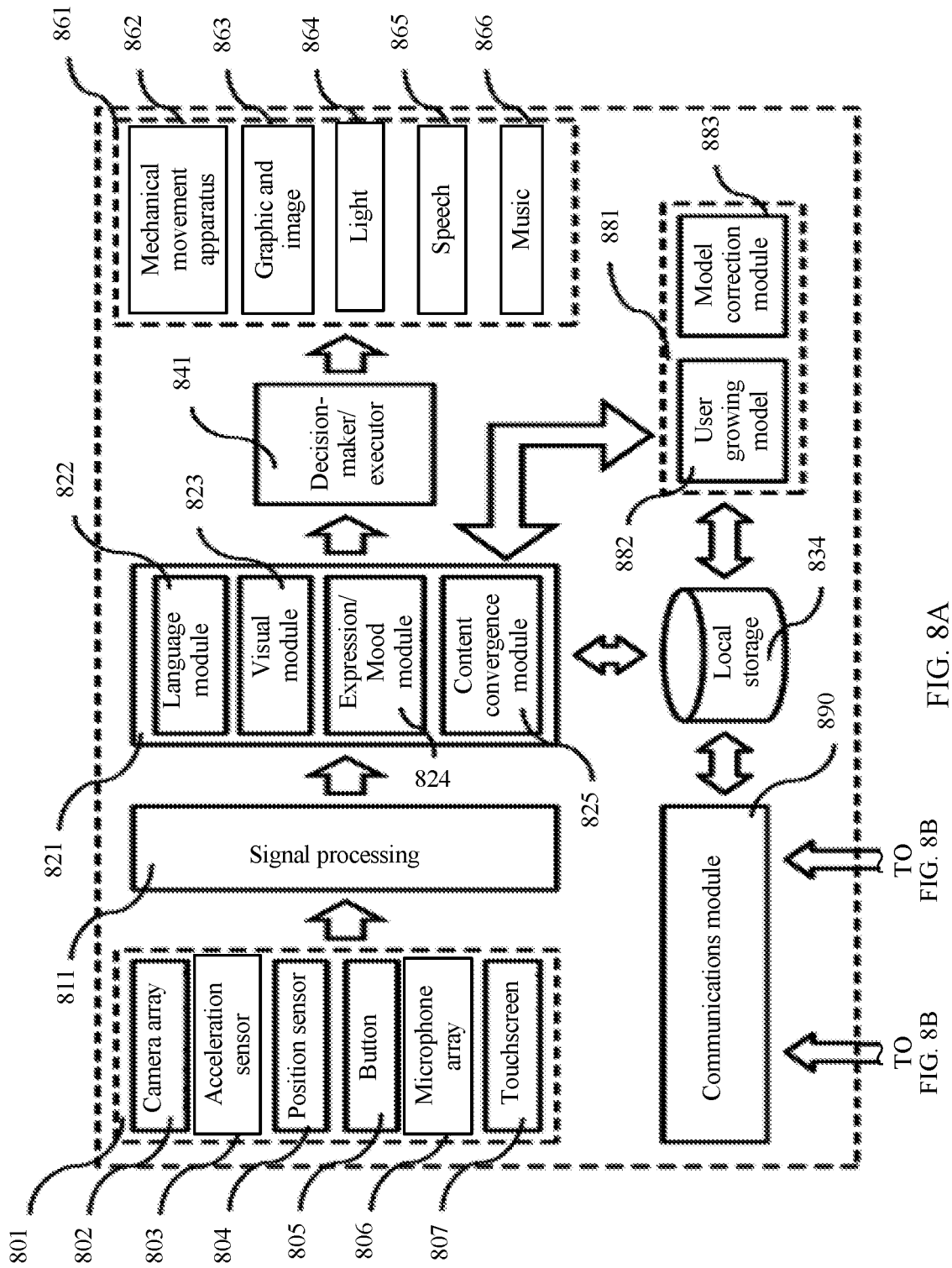
FIG. 8A and FIG. 8B are a schematic diagram of a basic architecture of software modules of a care-giving robot according to this application.
Figure 8B:
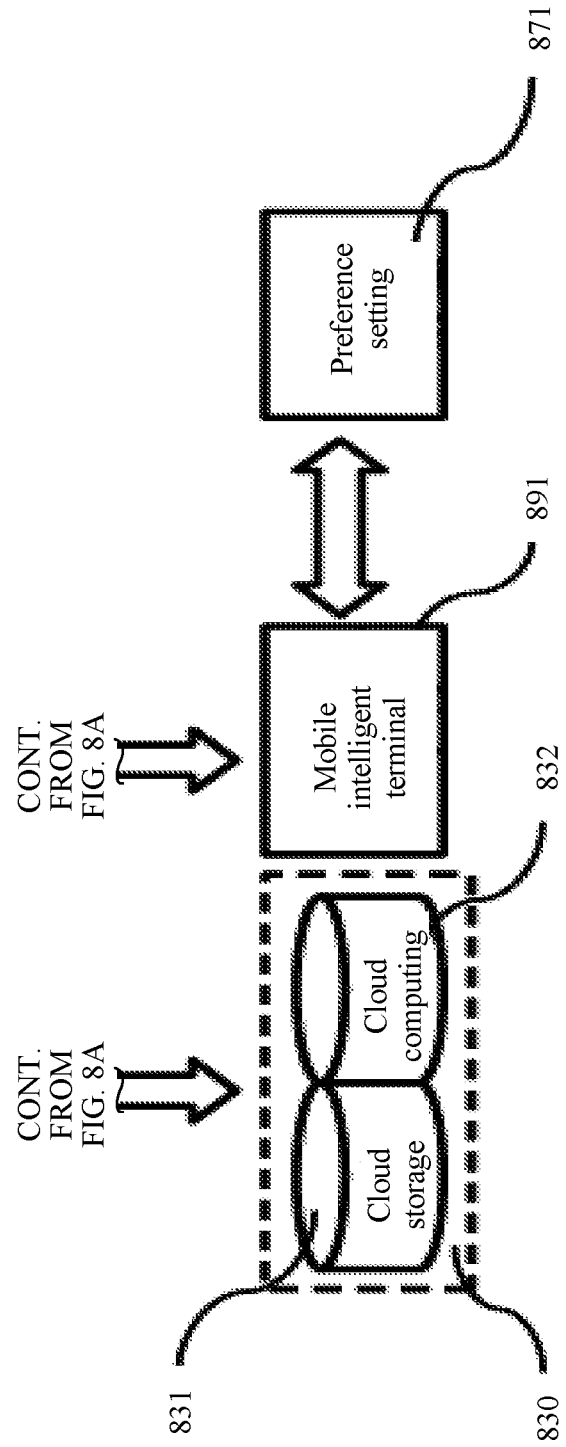

In an embodiment of the present disclosure, a basic architecture of software modules of a care-giving robot may be shown in FIG. 8A and FIG. 8B. The basic architecture includes a sensor module 801 and an artificial intelligence module 821. The sensor module 801 includes a camera array 802 for face and expression recognition, an acceleration sensor 803 for position and action recognition, a position sensor 804 for indoor/outdoor localization, a start/pause/emergency button 805, a microphone array 806 for receiving user and environment sound, and a touchscreen 807 for receiving a touch control instruction of a user. The artificial intelligence module 821 includes a language module 822, a visual module 823, an expression/mood module 824, and a content convergence module 825. The artificial intelligence module 821 outputs, based on rich environment sensing signals that are obtained by various sensors and that are processed through signal processing 811 and a machine learning model parameter, namely, a growing model capability parameter matrix, that is provided by a model engine 881, a control signal of the care-giving robot obtained through machine learning. A decision-maker/executor 841 controls an execution apparatus 861 to implement various interaction content of the care-giving robot, including but not limited to mechanical position movement implemented using a mechanical movement apparatus 862, expression simulation and displaying implemented using a graphic and image 863, text and pattern presentation, a light effect implemented using light 864, music playing implemented using music 866 or a speaking speed, speech, tone, and conversation content to which the care-receiving object can adapt and that are implemented through speech 865, and establishing a human fellow-like close relationship with the care-receiving object through rich interaction and applications. The model engine 881 includes a user growing model module 882 and a model correction module 883. Another part of data of the artificial intelligence module 821 is data from a local memory 834 and a cloud memory 831. Further, a part of the other part of data is machine learning outcomes achieved by the artificial intelligence module 821, and the other part may be ability testing data of the care-receiving object provided by a third-party network cloud service organization 830, or other data transmitted from a mobile intelligent terminal 891. Data from the cloud memory 831 is sent to the local memory 834 using a communications module 890, for example, a preference setting 871 about the growing model capability parameter matrix. The third-party network cloud service organization 830 further includes cloud computing 832.

Figure 9:
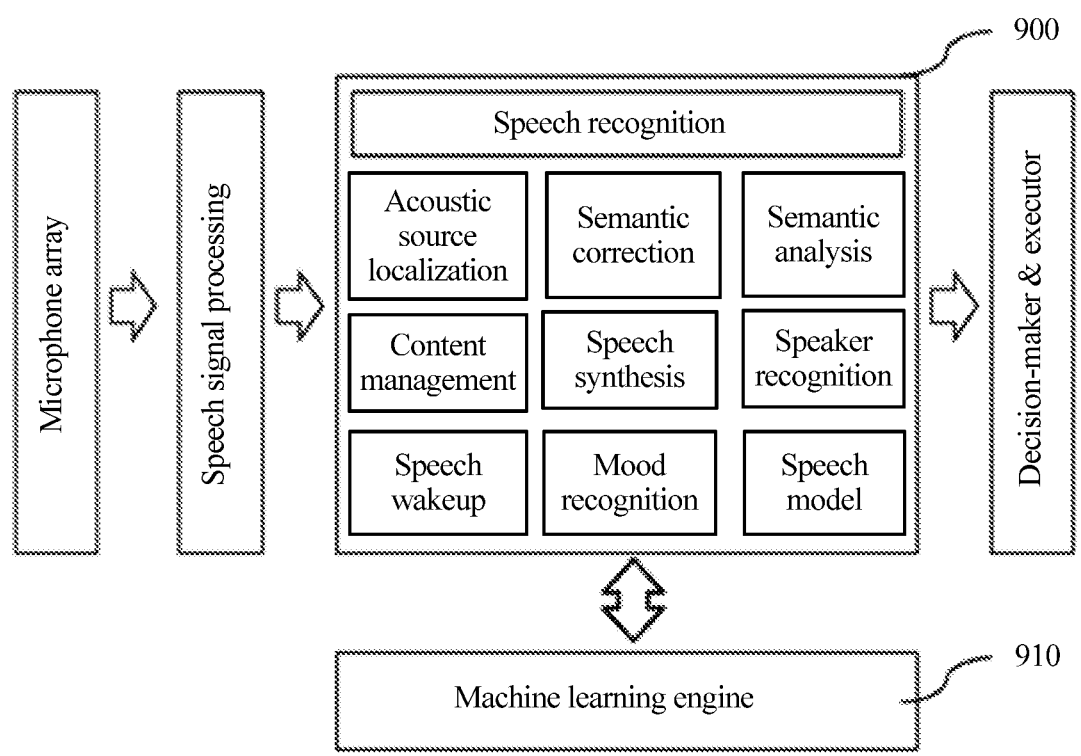
FIG. 9 is a schematic structural diagram of a language module of a care-giving robot according to this application.

In this embodiment of the present disclosure, the language module of the care-giving robot is the "ear and mouth" of the care-giving robot. A specific structure of the module is shown in 900 in FIG. 9, and includes sub-function modules such as speech recognition, acoustic source localization, semantic correction, semantic analysis, content management, speech synthesis, speaker recognition, speech wakeup, mood recognition, and a speech model. An input signal of the language module is a signal obtained after a speech signal processing module processes a sound signal of an ambient environment collected by the microphone array. In most cases, the microphone array needs to accurately recognize a care-receiving object in a noisy environment, other related people, and a position or an orientation of another acoustic source in the environment, learn through distinguishing whether it is a background noise of the environment or talking sound of people, and accurately recognize conversation content. The microphone array may be an array of a plurality of micro-electro-mechanical system (MEMS) microphones, and is installed on surfaces of some components of the child care-giving robot, or may be a single omnidirectional microphone or a combination of unidirectional microphones, and is installed on surfaces of the head, the neck, the back, and even the mechanical arm and a mechanical crawler/wheel movement apparatus. In an optional implementation, the language module uses a natural language processing algorithm, converts a speech signal into a text, performs semantic correction and semantic analysis processing according to an appropriate language rule, further converts the text into a text record that can be processed, and further parses the text record to understand an intention of an interaction object. A format of the text record in the natural language processing algorithm may be, for example, a Backus-Naur Form (BNF) mark, a java speech grammar format (Java Speech Grammar Format, JSGF), or a speech recognition grammar format (SRGF). When user speech data of many interaction objects is collected, a statistical algorithm may be introduced using a machine learning engine 910, to further improve speech recognition accuracy, and refresh a speech model of the interaction object. A speaker recognition module of the language module 900 may recognize a speaker identity of the interaction object, to distinguish whether the interaction object is a care-receiving object, a guardian of the care-receiving object, a teacher providing assistance, or a baby-sitter. The content management module outputs content information of speech interaction based on the speaker identity, and a user data and interaction content package provided by cloud storage and cloud computing of the third-party network cloud service organization, the decision-maker & executor sends an instruction, and the instruction is output on a user interaction interface of the care-giving robot in a manner of sound, a text, an image, light, and the like. The speech model module may obtain a speech model of the object through fitting based on the speech information of the interaction object, to quantize and evaluate a speech feature of the speech object. The model may be from the third-party network cloud service organization, for example, a professional testing result of a commercial organization providing a professional child education service. The machine learning engine 910 provides a machine learning model for the speech module 900 for further training, to improve machine recognition efficiency and accuracy of speech, and improve content quality of speech interaction. In addition, the speech signal processing module in FIG. 9 removes sound that is not in a particular direction using a sound beamforming algorithm, and obtains a sound signal in the particular direction. The sound beamforming algorithm may allow simultaneous input of sound in a plurality of orientations around the care-giving robot. The speech signal processing module may further include a speech/non-speech detection algorithm, to recognize whether an attribute of an acoustic source is a person or another acoustic source. The speech signal processing module may further include an ambient noise suppression algorithm. For example, the following configuration may be performed an omnidirectional microphone collects an ambient noise signal, or an omnidirectional microphone is installed on a surface of the mechanical crawler/wheel movement apparatus and collects running noise of a mechanical apparatus, or an omnidirectional microphone collects ambient noise having close strength in various orientations near the care-giving robot, or the like. These ambient noise signals are removed using the ambient noise suppression algorithm during sound synthesis processing, to improve strength of a desired signal. In some other feasible embodiments, beam direction information of sound may be further combined with an image captured by the visual module, to calculate and recognize whether an attribute of an object making sound is a care-receiving object, another person, or another environment acoustic source. The visual module may direct a visual orientation of the robot to an orientation of the acoustic source with reference to dragging of the mechanical crawler/wheel movement apparatus, to improve sound recognition efficiency.

Figure 10:
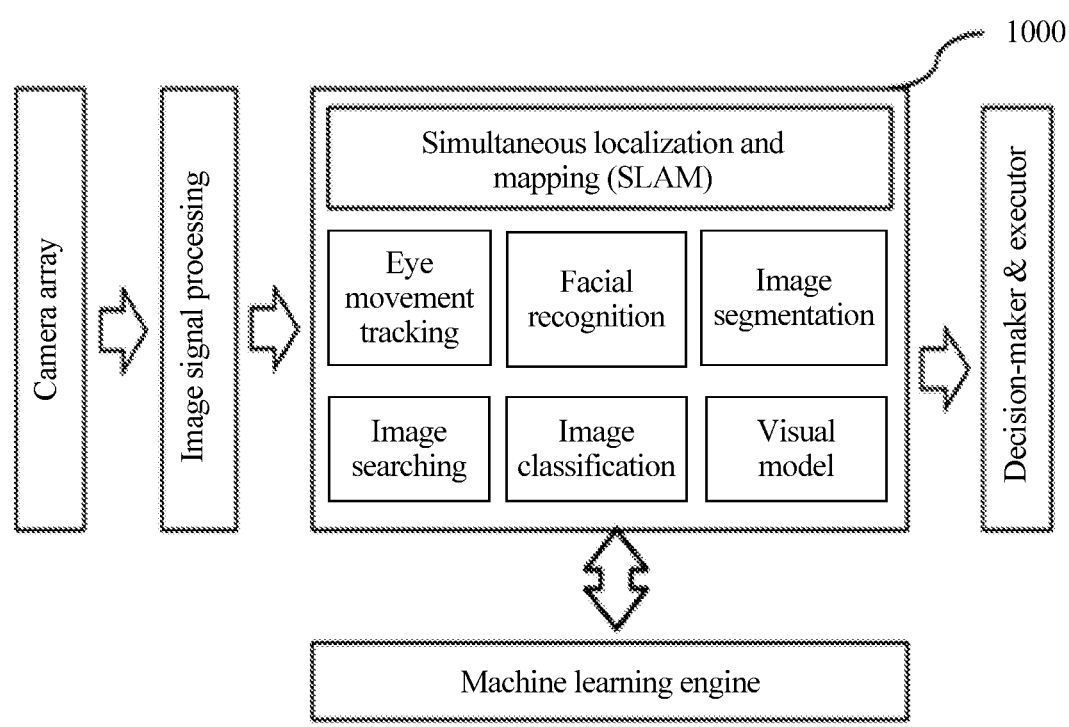
FIG. 10 is a schematic structural diagram of a visual module of a care-giving robot according to this application.

In this embodiment of the present disclosure, the visual module of the care-giving robot is the "eye" of the care-giving robot. A specific structure is shown in 1000 in FIG. 10, and includes sub-function modules such as simultaneous localization and mapping (SLAM), eye movement tracking, facial recognition, image segmentation, image searching, image classification, and a visual model. A signal input by the visual module is obtained after image signal processing is performed on a video or image signal collected by the camera array. The camera array may be a group of sensors having a plurality of cameras and may be a dual-camera module having an image depth detection ability, where one color camera obtains planar color image information of the object, and the other infrared camera obtains depth information of the target. The camera array may detect a contour, a surface status, a moving status, and a color of the target. The camera array may be configured to obtain an emotion status of the care-receiving object in an environment of a sensed target. For example, the visual module may be configured to detect whether there is a person in a nearby environment, obtain a facial expression of the object, and predict a current emotion status of the object using an emotion recognition algorithm. When the care-receiving object makes short "Ah . . . " sound, the microphone array and the sensor group of the care-giving robot learn that the sound comes from a particular orientation of a nearby environment and reaches particular strength, and the care-giving robot is activated from a sleep state. The language module calculates an orientation of an acoustic source and sends a drive signal. The decision-making/execution module drives the mechanical crawler/wheel movement apparatus to turn the camera to the orientation of the acoustic source, and starts the visual module to obtain a planar color image in the orientation, detect a depth of the target, and start facial recognition. The image segmentation module intercepts a facial expression image of the target. The image searching module searches the memory to determine whether there is a matched registered facial image in a visual range, and if a registered facial image is matched, further obtains a facial expression image of the care-receiving object, and sends the facial expression image and a sound signal of the care-receiving object to a mood recognition module of the language module for determining a mood status of the object. The mood recognition module recognizes whether the care-receiving object has a happy mood, an angry mood, a despising mood, a disgust mood, a fear mood, a sad mood, a confusing mood, a frustration mood, a surprising mood, or the like, and outputs an emotion status parameter matrix. If the image searching module has not matched a registered facial image, the robot switches to the sleep state. The facial recognition module of the visual module may implement active human body tracking. Further, an image classification module of the visual module may recognize a face of a human body object, and separate parts of the care-receiving object such as the face, the head, the body, and the arm from an image background with reference to a target human body image with a depth obtained by the camera array and a recognition signal of another sensor such as an infrared distance sensor or a radio-frequency identification (RFID) detection sensor and with reference to the depth information of the target image, to obtain and recognize a facial part of the human body, a human body skeleton, a body posture, and the like of the care-receiving object, and implement target tracking and predict a moving track based on a captured human body target. Optionally, the camera array may be further configured to track a hand action of the care-receiving object, and implement target gesture tracking and gesture instruction recognition using a gesture recognition algorithm. An eye movement tracking module of the visual module captures a line of sight and a focus of a user using an eye image of a human body object, and predicts a current interest point of the user based on transition of an eye focus of the user, staying duration of the focus, an eye closing action and duration, blinking frequency, and the like. Optionally, in a scenario of interaction between the care-giving robot and the care-receiving object, a simultaneous localization and mapping function module included in the visual module constructs an indoor/outdoor map around the care-giving robot in the current scenario through dynamic tracking on the care-receiving object and a status of recognizing a reference object and an obstacle in a care-giving environment, synchronously determines a position of the care-giving robot in the current map, and plans a next-step moving route of the care-giving robot. Further, a track of a random target may be predicted using an interacting multiple model (IMM) method of a current statistical model, and a dynamic random target is associated with the map using an affinity data association method. The constructed map includes a static feature point and a track of the random target. When a scenario may include a plurality of interaction objects, the simultaneous localization and mapping module may memorize sequence data of a plurality of interaction objects entering the interaction scenario. After a time interval, the care-giving robot can turn the body such that the camera array scans positions of a plurality of previously memorized interaction objects, to refresh sequence data of the interaction objects in the memory, and form new sequence data of the interaction objects. For example, for this feature, accuracy of the sequence data of the interaction objects may be improved in a speech interaction mode. For example, the care-giving robot may say "Hello, Xiaobao", then determine, based on a response speech and expression, or recognition of a body posture of the interaction object, whether the interaction object is "Xiaobao", and refresh sequence data of "Xiaobao" in the memory.

Figure 11:
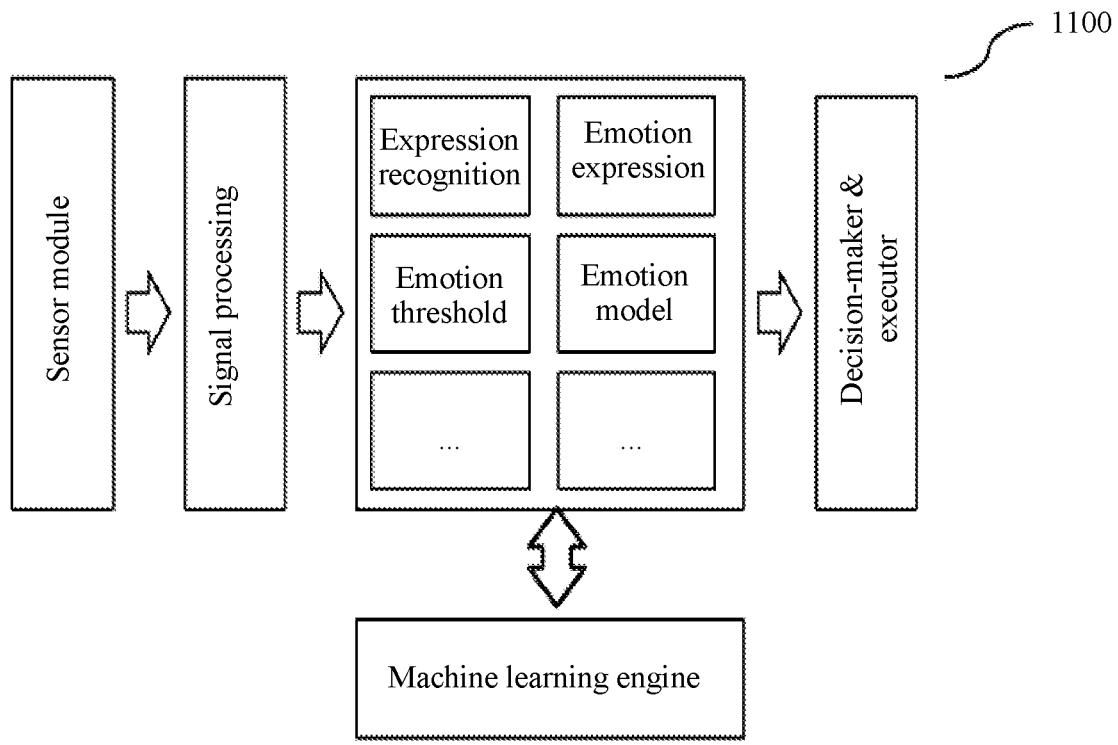
FIG. 11 is a schematic structural diagram of an expression and mood module of a care-giving robot according to this application.

In this embodiment of the present disclosure, the expression and mood module of the care-giving robot is the "face" of the care-giving robot. A specific structure is shown in 1100 in FIG. 11, and includes sub-function modules such as expression recognition, emotion expression, an emotion threshold, and an emotion model. When the care-giving robot interacts with the care-receiving object, the expression/mood module is configured to implement emotion recognition and emotion expression functions. Main content of emotion recognition includes two aspects mental and social awareness, and mental and social learning. An external signal of the mental and social awareness may be obtained by the sensor module, and the mental and social awareness includes integrated machine awareness of clues that is of a natural social scene and that is obtained when the care-giving robot interacts with the care-receiving object, for example, speech and tone, conversation semantics, a facial expression, an eye focus, a body posture and a moving track, and a touch gesture. The mental and social learning includes a machine learning algorithm. An identity, an activity mode, a preference, and interests of the care-receiving object are analyzed based on a plurality of categories of data that is of the natural social scene and that is obtained by the sensor module. For example, a speech sample of the care-receiving object is recorded, and the identity of the care-receiving object is detected using the speech recognition module. Then, more personal information granted by the third-party network cloud service organization, an education organization, a social application, or the like may be obtained from the network based on the identity of the care-receiving object, and an emotion model of the object is established or updated in the emotion module. The expression recognition module captures a facial expression of the care-receiving object in real time using the camera array, converts the captured facial expression into an expression parameter matrix, compares a digital feature of the expression parameter matrix with a digital feature of a parameter matrix of an existing facial expression image sample training set of the care-receiving object stored in local storage or cloud storage, and if the digital feature of the expression parameter matrix is highly similar to or matches the digital feature of the parameter matrix of the facial expression image sample training set, determines that the facial expression of the care-receiving object in this case is a facial expression defined in the sample training set. Further, if a digital feature of a parameter matrix of a to-be-recognized facial expression is A, and a digital feature of an expression image stored in the sample training set is B, if a difference between A and B is less than a specified threshold, it is considered that the captured facial expression matches the stored expression image, or if a difference between A and B is greater than or equal to a specified threshold, the to-be-recognized facial expression A is added to another group of facial expression image B' of the sample training set. The foregoing steps are repeated constantly until the to-be-recognized facial expression A matches a unique group of facial expression image, to complete an expression recognition process. If a unique group of facial expression image matching the to-be-recognized facial expression image cannot be found in the sample training set, sample training is performed. A specific sample training process is increasing a specified threshold, and the matching steps are repeated until a unique group of facial expression image matching the to-be-recognized facial expression A is found. If at least two groups of facial expression images matching the to-be-recognized facial expression image are found in the sample training set, the specified threshold is decreased, and the foregoing matching steps are repeated until a unique group of facial expression image matching the to-be-recognized facial expression A is matched, and a matching process ends. An emotion expression module is based on an emotion attribute corresponding to an emotion model of the care-receiving object, where the emotion model may be obtained through machine learning based on expression recognition. The care-giving robot learns, by recognizing a facial expression of the care-receiving object, that the care-receiving object has a positive mood, for example, smiling, calm, or satisfactory. Then, expression content and an expression manner that can be accepted by the care-receiving object are selected, for example, a new dialog and new knowledge are output. However, if the care-giving robot determines that the expression of the care-receiving object is of a negative mood, for example, tired, obtuse, or confused, a current interaction and communication mode is adjusted, for example, appropriate pausing is made, a speaking speed is reduced, an excitement language is output, a smile is simulated, or slow music background is switched to such that the care-receiving object maintains in a relatively stable mood status, to avoid propagation of a negative mood. Optionally, different expression forms may be used for same content. For example, a text is converted into a color image. Because there are a plurality of manners of content needing to be expressed, a conversion manner of an expression manner is constantly optimized in a machine learning manner using a learning model of a plurality of sequences and based on content of a content object, an intelligence type of an interaction object, and an expression mode of a user preference, to achieve an objective of efficient interaction. In an embodiment, each piece of content needing to be exchanged may use interaction interface designs of a plurality of forms. For example, interaction may be set to a single-step mode in which there is only one input each time, or a synchronous mode of inputting speech, touch control, and image information at the same time. For output, output may be made in a multimedia manner of outputting a natural language, a sound effect or music, position movement, displaying of a text/graphic/image/video, and a light effect. An emotion threshold module monitors an emotion threshold of the care-receiving object any time in a process of recognizing and predicting an emotion status of the care-receiving object, to maintain an effective and sustainable communication status. The emotion threshold is an emotion critical value before the care-receiving object cracks up under irritation of an external environment in various processes of interacting with the environment. For example, the care-receiving object already has a mood fluctuation in an interaction process, and if a current interaction mode continues, the care-receiving object cracks up, and may be angry, may cry, may make a scene, or the like. Alternatively, the care-receiving object may have started to suffer from strong irritation of the environment, and if an interaction policy is not adjusted, the care-receiving object may be mentally injured. An emotion status in the critical state is the emotion threshold. If the emotion threshold is set excessively high, for example, in a child class education scenario, if a child frequently requests to ask questions, and a tutor is not prompted to give a presentation chance to the child in a timely manner because the emotion threshold of the care-giving robot is set excessively high, enthusiasm of the child may be affected, and a long-term teaching effect may be affected. When the emotion threshold is set excessively low, excessive invalid message prompts may be generated in a teaching process, leading to excessively low system efficiency such that the emotion threshold cannot be used. To resolve the foregoing problem, the emotion threshold of the care-giving robot in the interaction process is dynamically and intelligently adjusted. An intensive learning method in machine learning is used to obtain an appropriate environment emotion threshold more suitable for a current conversation and interaction scenario. For example, a Q-Learning algorithm is used. A main learning target of the algorithm is to select an optimal emotion threshold $\pi$ in an uncertain conversation scenario and environment based on an evaluation function such that a largest accumulative discount return is obtained within a learning time. When an emotion parameter in the interaction process approaches or exceeds the threshold $\pi$ the care-giving robot actively adjusts the communication and interaction policy, or an operator or guardian is prompted through sound, a graphic, a text, or light, to adjust the communication and interaction policy. The emotion model module outputs and matches an emotion model of a current user based on real-time information of the care-receiving object captured by the sensor module, for example, a facial expression, speech and tone, a body posture, a moving status, an indoor/outdoor position, and a biological signal. A commonly seen quantization manner of the emotion model parameter is outputting an emotion status parameter matrix of an object. Content of emotion expression is implemented by the content convergence module. The content convergence module obtains, through matching based on an emotion status parameter matrix of an emotion model of the care-receiving object, a policy used for the process of interacting with the care-receiving object, an interaction task needing to be executed, and a list of activity content, and forms a control instruction, where the list includes but is not limited to a plurality of interaction forms such as mechanical position movement, simulation and display of an expression, a light effect, music playing, a text, a pattern, an appropriate speaking speed, speech, tone, and conversation content. The decision-maker & executor drives the execution apparatus to complete an interaction task using a corresponding hardware function module.

Figure 12:
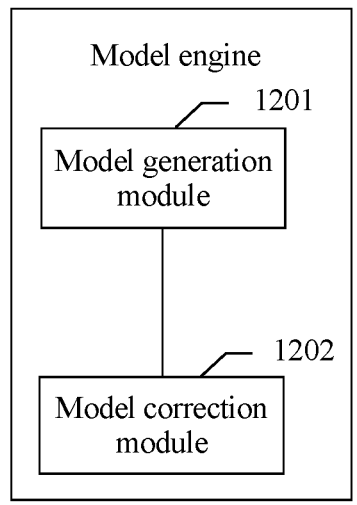
FIG. 12 is a schematic diagram of a model engine according to this application.

Based on a same inventive concept as the method embodiment, this application further provides a model engine, as shown in FIG. 12, including a model generation module 1201 configured to receive data of a target object, and generate a growing model capability parameter matrix of the target object, where the data includes an capability parameter of the target object, the capability parameter includes an actually measured capability parameter and a statistical capability parameter that corresponds to the target object, and the generated growing model capability parameter matrix of the target object includes the capability parameter, and an capability parameter adjustment value and a comprehensive capability parameter that are calculated based on the capability parameter, and a model correction module 1202 configured to adjust the capability parameter adjustment value in the growing model capability parameter matrix based on an adjustment formula coefficient or based on a standard growing model capability parameter matrix, to determine an adjusted capability parameter adjustment value, where the formula is used to calculate the comprehensive capability parameter and the capability parameter adjustment value based on the capability parameter, where the model correction module 1202 is further configured to determine whether the adjusted capability parameter adjustment value exceeds a preset threshold, and send, by the model engine, the adjusted capability parameter adjustment value to a machine learning engine if the adjusted capability parameter adjustment value is within a range of the preset threshold, where the machine learning engine provides, for an artificial intelligence module based on the capability parameter adjustment value, an capability parameter required for interacting with the target object.

Figure 13:
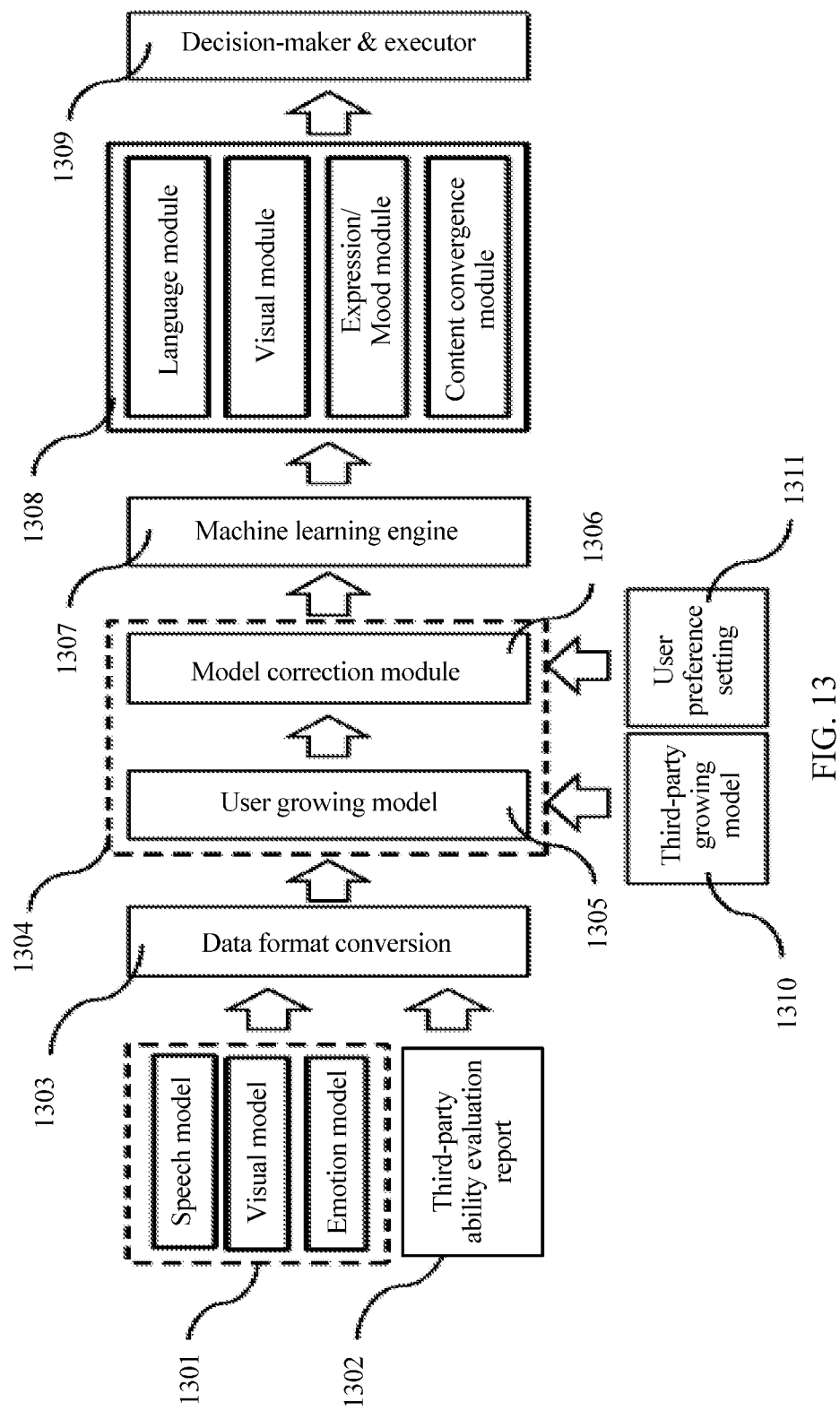
FIG. 13 is a schematic diagram of another model engine according to this application.

In an optional embodiment, the model engine provides a model for machine learning and training for an artificial intelligence module of a child care-giving robot, to maximize an effect. A specific structure is shown in FIG. 13. The artificial intelligence module of the care-giving robot is trained and performs learning based on real-time data of a natural social scene of an interaction object obtained by a sensor module, to obtain environment data 1301 of a care-receiving object. A value template of training and learning includes but is not limited to a language module, a visual module, and an expression/mood module. The environment data of the care-receiving object includes at least speech, a visual model, and machine awareness data of emotion, and further includes testing data 1302 provided in a third-party ability evaluation report provided by at least one third-party network cloud service organization. Further, a format of the environment data 1301 is not completely the same as a format of the testing data 1302. For example, the format of the environment data 1301 is a parameter matrix, and the format of the testing data 1302 is a WORD document in a fixed format. The environment data and the testing data are processed through data format conversion 1303, and are input to an intelligent engine 1304 for machine learning and training, to obtain a user growing model 1305 including a plurality of categories of user features. The user growing model 1305 may be reflected using a growing model capability parameter matrix. FIG. 13 further includes a model correction module 1306, a machine learning engine 1307, an artificial intelligence module 1308, a decision-maker and executor 1309, a third-party growing model 1310, and a user preference setting 1311.

In this embodiment of the present disclosure, a feature and a requirement of a user are better matched through self-adaptive adaptation and machine learning, to constantly optimize a manner of emotion communication with the care-receiving object in a particular case. Information from a plurality of information sources is obtained, including information from the user preference setting, information from the sensor module, information from another mobile intelligent apparatus, a global positioning system (GPS) signal, data of a third-party network cloud service organization from the Internet. A use environment of the care-receiving object is constantly obtained and recognized through machine learning and the like, to adapt to and improve a service manner and content of the care-giving robot.

Module division in this embodiment of this application is an example, is merely logical function division, and may be other division in an embodiment. In addition, function modules in the embodiments of this application may be integrated into one processor, or each of the modules may exist alone physically, or two or more modules are integrated into one module. The integrated module may be implemented in a form of hardware, or may be implemented in a form of a software function module.

Figure 14:
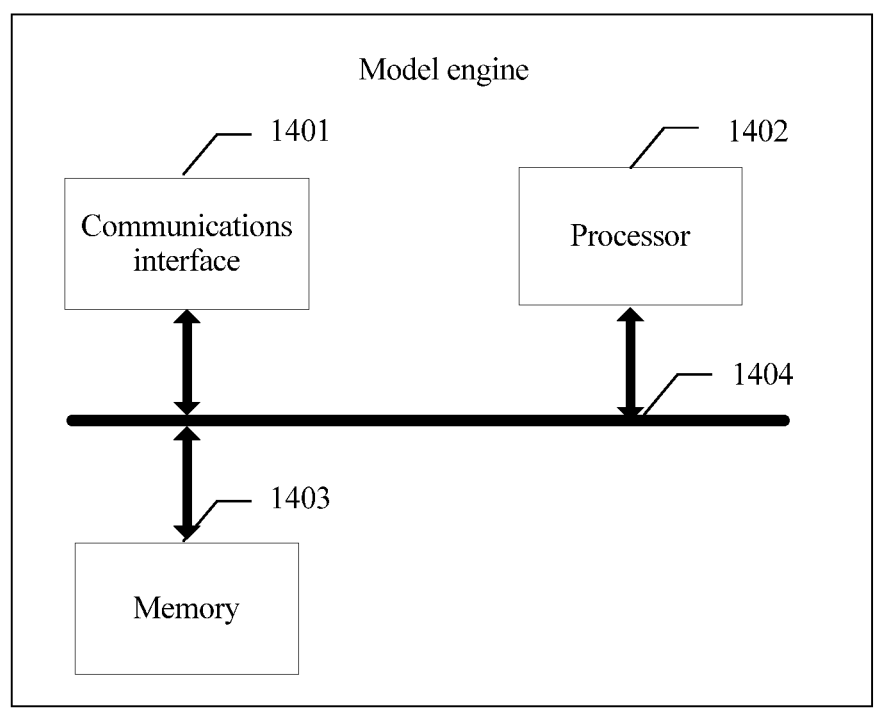
FIG. 14 is a schematic diagram of a hardware structure of a model engine according to this application.

When the integrated module is implemented in a form of hardware, as shown in FIG. 14, the model engine may include a processor 1402. Hardware of an entity corresponding to the module may be the processor 1402. The processor 1402 may be a central processing unit (CPU), a digital processing module, or the like. The model engine may further include a communications interface 1401, and the processor 1402 receives data through the communications interface 1401. The apparatus further includes a memory 1403 configured to store a program executed by the processor 1402. The memory 1403 may be a nonvolatile memory such as a hard disk drive (HDD) or a solid state drive (SSD), or may be a volatile memory such as a random access memory (RAM). The memory 1403 is any other medium that can carry or store expected program code in a form of an instruction or a data structure and can be accessed by a computer, but is not limited thereto.

The processor 1402 is configured to execute the program code stored in the memory 1403, and is configured to perform the method described in the embodiment shown in FIG. 4. Reference may be made to the method described in the embodiment shown in FIG. 4, and details are not described in this application again.

A specific connection medium between the communications interface 1401, the processor 1402, and the memory 1403 is not limited in this embodiment of this application. In this embodiment of this application, in FIG. 14, the memory 1403, the processor 1402, and the communications interface 1401 are connected using a bus 1404. The bus is represented using a thick line in FIG. 14, and a connection manner between other parts is merely used as an example for description, and does not limit this application. The bus may be classified into an address bus, a data bus, a control bus, and the like. For ease of representation, the bus is represented using only one bold line in FIG. 14. However, it does not indicate that there is only one bus or only one type of bus.

An embodiment of the present disclosure further provides a computer readable storage medium configured to store a computer software instruction used to execute operations that need to be executed by the processor. The computer software instruction includes a program used to execute the operations that need to be executed by the processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a compact disc read only memory (CD-ROM), and an optical memory) that include computer usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data processing method for a care-giving robot, implemented by a model engine comprising a memory storing instructions and a processor to execute the instructions, wherein the method comprises:
   receiving data of a target object, wherein the data comprises a capability parameter of the target object, wherein the capability parameter comprises a measured capability parameter and a statistical capability parameter that correspond to the target object;
   generating a growing model capability parameter matrix of the target object, wherein the growing model capability parameter matrix comprises the capability parameter, a capability parameter adjustment value, and a comprehensive capability parameter that are each based on the capability parameter;
   adjusting the capability parameter adjustment value in the growing model capability parameter matrix to determine an adjusted capability parameter adjustment value, wherein the comprehensive capability parameter and the capability parameter adjustment value are based on a formula that uses the capability parameter;

determining whether the adjusted capability parameter adjustment value exceeds a preset threshold; and sending the adjusted capability parameter adjustment value to a machine learning engine when the adjusted capability parameter adjustment value is within a range of the preset threshold, wherein the capability parameter adjustment value enables the machine learning engine to provide to an artificial intelligence apparatus a target capability parameter based on the capability parameter adjustment value, and wherein the target capability parameter is for interacting with the target object.

2. The data processing method of claim 1, wherein receiving the data of the target object and generating the growing model capability parameter matrix of the target object further comprises:

receiving the capability parameter of the target object;

determining, based on the capability parameter, the capability parameter adjustment value and the comprehensive capability parameter; and adding the capability parameter, the capability parameter adjustment value and the comprehensive capability parameter to a specified capability parameter matrix template to generate the growing model capability parameter matrix of the target object.

3. The data processing method of claim 1, wherein after adjusting the capability parameter adjustment value in the growing model capability parameter matrix, the method further comprises adjusting the capability parameter in the growing model capability parameter matrix according to a received instruction so as to manually adjust the capability parameter.

4. The data processing method of claim 1, wherein a first weighted average value of the adjusted capability parameter adjustment value is greater than or equal to a second weighted average value of the measured capability parameter before adjustment.

5. A model engine, comprising:

a memory comprising instructions; and a processor coupled to the memory and configured to execute the instructions, wherein the instructions cause the processor to:

receive data of a target object, wherein the data comprises a capability parameter of the target object, wherein the capability parameter comprises a measured capability parameter and a statistical capability parameter that correspond to the target object; and generate a growing model capability parameter matrix of the target object, wherein the growing model capability parameter matrix of the target object comprises the capability parameter, a capability parameter adjustment value and a comprehensive capability parameter that are each based on the capability parameter;

adjust the capability parameter adjustment value in the growing model capability parameter matrix to determine an adjusted capability parameter adjustment value, wherein the comprehensive capability parameter and the capability parameter adjustment value are based on a formula that uses the capability parameter;

determine whether the adjusted capability parameter adjustment value exceeds a preset threshold; and send the adjusted capability parameter adjustment value to a machine learning engine when the adjusted capability parameter adjustment value is within a range of the preset threshold, wherein the capability parameter adjustment value enables the machine learning engine to provide to an artificial intelligence apparatus a capability parameter based on the capability parameter adjustment value, wherein the capability parameter is required for interacting with the target object.

6. The model engine of claim 5, wherein the processor is further configured to:

receive the capability parameter of the target object;

determine, based on the capability parameter, the capability parameter adjustment value and the comprehensive capability parameter; and add the capability parameter, the capability parameter adjustment value, and the comprehensive capability parameter to a specified capability parameter matrix template to generate the growing model capability parameter matrix of the target object.

7. The model engine of claim 5, wherein the model processor is further configured to:

adjust the capability parameter in the growing model capability parameter matrix according to a received instruction so as to manually adjust the capability parameter.

8. The model engine of claim 5, wherein a first weighted average value of the adjusted capability parameter adjustment value is greater than or equal to a second weighted average value of the measured capability parameter before adjustment.

9. A non-transitory computer readable storage medium comprising instructions that when executed by an apparatus comprising a processor, cause the apparatus to:

receive data of a target object from a communications interface, wherein the data comprises a capability parameter of the target object, wherein the capability parameter comprises a measured capability parameter and a statistical capability parameter that corresponds to the target object;

generate a growing model capability parameter matrix of the target object, wherein the growing model capability parameter matrix of the target object comprises the capability parameter, a capability parameter adjustment value and a comprehensive capability parameter that are calculated based on the capability parameter;

adjust the capability parameter adjustment value in the growing model capability parameter matrix, to determine an adjusted capability parameter adjustment value, wherein a formula is used to calculate the comprehensive capability parameter and the capability parameter adjustment value based on the capability parameter;

determine whether the adjusted capability parameter adjustment value exceeds a preset threshold; and send the adjusted capability parameter adjustment value to a machine learning engine when the adjusted capability parameter adjustment value is within a range of the preset threshold so as to enable the machine learning engine to provide to an artificial intelligence apparatus a capability parameter based on the capability parameter adjustment value, wherein the capability parameter is required to interact with the target object.

10. The non-transitory computer readable storage medium of claim 9, wherein the processor is further configured to:
  receive the capability parameter of the target object through the communications interface;
  determine, based on the capability parameter, the capability parameter adjustment value and the comprehensive capability parameter; and
  add the capability parameter, the capability parameter adjustment value, and the comprehensive capability parameter to a specified capability parameter matrix template to generate the growing model capability parameter matrix of the target object.

11. The non-transitory computer readable storage medium of claim 9, wherein the processor is further configured to:
  adjust the capability parameter in the growing model capability parameter matrix according to a received instruction so as to manually adjust the capability parameter.

12. The data processing method of claim 1, wherein the adjusting is based on an adjustment formula coefficient.

13. The data processing method of claim 1, wherein the adjusting is based on a standard parameter matrix.

14. The data processing method of claim 1, further comprising detecting a feature of a care-receiving object, wherein the feature is a sound, an expression, or a behavior.

15. The model engine of claim 5, wherein the model corrector is further configured to adjust the capability parameter adjustment value based on an adjustment formula coefficient.

16. The model engine of claim 5, wherein the model corrector is further configured to adjust the capability parameter adjustment value based on a standard parameter matrix.

17. The model engine of claim 5, further configured to detect features of a care-receiving object such as sound, an expression, and behavior.

18. The non-transitory computer readable storage medium of claim 9, wherein the apparatus is further configured to adjust based on an adjustment formula coefficient.

19. The non-transitory computer readable storage medium of claim 9, wherein the apparatus is further configured to adjust based on a standard parameter matrix.

20. The non-transitory computer readable storage medium of claim 9, wherein the apparatus is further configured to detect a feature of a care-receiving object, wherein the feature is a sound, an expression, or a behavior.

* * * * *